(12) United States Patent
Ogawa et al.

(10) Patent No.: US 6,405,142 B1
(45) Date of Patent: Jun. 11, 2002

(54) FLUID ANALYZER AND PROGRAM RECORDING MEDIUM

(75) Inventors: Osamu Ogawa, Kyoto; Yoshihiro Hattori, Neyagawa; Sachio Nagamitsu, Kyoto; Hisasi Kodama, Ikoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/373,012

(22) Filed: Aug. 11, 1999

(30) Foreign Application Priority Data

Aug. 11, 1998 (JP) .......................................... 10-227457

(51) Int. Cl.[7] ................................................. G01L 9/18
(52) U.S. Cl. ..................................... 702/50; 73/152.18
(58) Field of Search ............................. 702/50; 73/1.01, 73/1.02, 1.16, 1.57, 152.18; 324/306; 361/281

(56) References Cited

U.S. PATENT DOCUMENTS 5,450,568 A    9/1995  Saji et al.

FOREIGN PATENT DOCUMENTS

GB    2323949    10/1998

OTHER PUBLICATIONS

Great Britain Search Report dated Mar. 7, 2000, application No. 9918841.9.

*Primary Examiner*—Marc S. Hoff
*Assistant Examiner*—Edward Raymond
(74) *Attorney, Agent, or Firm*—Ratner & Prestia (57) ABSTRACT

A fluid analyzer including a physical property value setting section 2 for setting a physical property value in accordance with grid information for boundary conditions and object positions, a number-of-dimension control section 5 for controlling the number of dimensions of a space to be analyzed, a momentum correction section 51 for automatically correcting the momentum of the speed vector of an inlet or outlet, and a boundary condition control section 4 for automatically setting a boundary condition not diverged even in natural convection computation, which repeats repetitive computation until resulting in convergence after generating grids. Thereby, it is possible to accurately set a physical property value and an analysis dimension according to grid division, correct a momentum, and control natural convection computation.

19 Claims, 7 Drawing Sheets

FLUID ANALYZER AND PROGRAM RECORDING MEDIUM

BACKGROUND OF THE INVENTION

1. Field of the Invention

The present invention relates to a fluid analyzer used for example, design of a housing environment and a program-recording medium.

2. Description of the Related Art

Because of recent advancement and spread of a large high-speed computer capable of performing vectorizing computation or simultaneous parallel processing, a system is widely used which generates a computing grid in a large space having a complex boundary condition and then, generates a group of equations for expressing changes and states of various substances by a physical law for controlling changes of substances in the space, and solves the equations through repetitive computation. For example, a flat-plate stress analyzer using the finite element method is an example of the above system in a wide meaning and FIDAP and NASTRAN are also examples of programs used for the system.

Physical laws, formulas, and arts which are premises of these analyses such as the techniques for grid division (mesh division) of a space to be analyzed when using, for example, the mass conservation law, momentum conservation law, energy conservation law, coordinate transformation, finite difference method, or finite element method, how to provide a decision value or boundary condition used for deciding whether to perform repetitive computation for a predetermined difference, the technique for repetition when performing repetitive computation, the technique for solving a group of equations configuring a determinant, and the technique for simultaneous parallel processing by a large high-speed computer are, so to speak, publicly-known arts published in, for example, Fluid Engineering of Volume A5 of "Mechanical Engineering Handbook" edited by Japan Society of Mechanical Engineers and issued in 1987 and "Numerical Analysis of Heat Movement and Flow by Computer" written by SUHASU. V. PATANKA (transliterated) and translated by Yukio Mizutani and Shoji Kogetsu, and published byMORIKITA SHUPPAN (transliterated), in which fluid analysis results are also published in Summary Collection (China) of Academic Lectures of Congress of Architectural Institute of Japan, published in October, 1990. Therefore, their description is omitted. Moreover, because computation of pressure, momentum, mass, and calorie or computation of correction values of physical values, specifically, increase of calorie of a fluid by a value equivalent to decrease of momentum and thereby, correcting density or flow rate, and previously input of various physical property values such as density and viscosity corresponding to each temperature and pressure of a fluid necessary for the above computations are self-evident arts. Therefore, their description is omitted.

Then, one of the above techniques will be specifically described below.

1. The contents of an external force serving as a cause of a flow such as the shape of a space to be analyzed, the physical property value and flow rate of an internal fluid, and various formulas and physical laws used for analyses are inputted through CRT or a keyboard.

2. The grid division of a space to be analyzed is performed in accordance with a predetermined procedure. In this case, a grid interval (size) and arrangement position are designated by an analyzer in principle.

3. The number of times for repetitive computation is inputted by an analyzer.

4. Repetitive computation of fluid analysis is started.

5. It is decided whether physical values meet various formulas and physical laws used for analysis, for example, the difference between the computation result obtained in the last cycle and the computation result obtained in the present cycle converges to a predetermined value.

6. When the decision result converges to the predetermined value, the cycle of repetitive computation ends. However, if the result does not converge, a new cycle of repetitive computation is started.

However, when using these conventional methods, if an object and a fluid having physical property values different from each other are mixed, the length of a cell serving as the unit of the minimum size grid-divided to simplify a formula for thermal conduction is equalized between adjacent cells. Therefore, when a thin-flat object or a narrow space is present, the grid interval is decreased between at least adjacent cells of objects having physical property values different from each other in order to perform accurate analysis.

In this case, the grid interval is inevitably decreased under the above state. Therefore, when computing every space to be analyzed in three dimensions, computation frequently falls into an undesired state from viewpoints of storage resource and computation speed required by a computer.

Moreover, when setting a speed vector as a boundary condition, an outlet or inlet is set so that the speed vector coincides with a momentum vector. Therefore, whenever angles of an outlet or inlet vector are changed, a grid must be regenerated. Thus, a problem occurs that a lot of time is necessary.

Furthermore, to perform the steady computation of natural convection, a flow field becomes very unstable and computation diverges. Therefore, problems occur that even an expert of analysis must adjust the setting of a boundary condition and perform computation again.

Therefore, it is requested to realize an analyzer capable of accurately setting a physical property value in accordance with grid division information for object arrangement and boundary conditions, performing one-dimensional or two-dimensional computation in a three-dimensional space, adjusting a momentum in accordance with the momentum vector for outlet or inlet without correcting grid division, and automatically setting a boundary condition not diverged in natural-convection computation.

SUMMARY OF THE INVENTION

The present invention is made to solve the above problems of a conventional analyzer and its object is to provide a fluid analyzer capable of further decreasing the computation time.

The 1st invention of the present invention is a fluid analyzer having a grid generation section for generating the grid of an analysis space in order to analyze the fluid in the analysis space, comprising:

physical-property value setting means for setting a new physical-property value in accordance with different physical values when adjacent cells among cells each of which is a minimum unit determined by the generated grid show physical property values different from each other; and number-of-dimension control-analysis means for (1) performing first analysis of the analysis space of a predetermined dimension by considering the adjacent cells as a larger-size new cell and using the new cell and the set physical property value and (2) replacing a partial region including the adjacent cells with a space at a dimension lower than the predetermined dimension, performing second analysis of the partial region in accordance with the original size of the adjacent cells and reflecting the result of the second analysis on the result of the first analysis.

One aspect of the present invention is a fluid analyzer comprising:

a grid generation section for generating the grid of an analysis space;

a boundary condition setting section for setting a boundary condition to the grid generated by the grid generation section;

fluid physical-value analysis section for computing the predetermined physical value of a fluid in accordance with given formula and boundary condition;

a fluid physical-value correction-analysis section for approximately correcting a result by the fluid physical-value analysis section in accordance with the fluid state of a pressure distribution and/or a speed distribution computed by the fluid physical-value analysis section and the physical property value of each physical value of a previously-given fluid or a predetermined physical law; and a repetitive-computation and control section for repeating computations from the fluid physical-value analysis section up to the fluid physical-value correction-analysis section in accordance with a predetermined procedure; wherein a physical-property-value setting section is included which sets a new physical property value in accordance with at least the position of an object and grid information including the divided state of the grid.

Another aspect of the present invention is a fluid analyzer, wherein the predetermined physical value is the pressure, speed, density, or temperature of the fluid, the predetermined physical law is the mass conservation law, momentum conservation law, or energy conservation law, and a number-of-dimension control-analysis section is included which performs analysis as a one-dimensional or two-dimensional space in some or all regions in the three-dimensional space of the grid generated by the grid generation section.

Still another aspect of the present invention is the fluid analyzer, wherein a momentum correction section is included which automatically corrects the momentum of a speed vector set to an outlet or inlet provided for the analysis space in accordance with the divided state of a grid and the information for an outlet or inlet angle.

Yet another aspect of the present invention is the fluid analyzer, wherein a boundary condition control section is included which controls the boundary condition of an outlet or an inlet in accordance with the boundary condition set by the boundary condition setting section.

Still yet another aspect of the present invention is the fluid analyzer, wherein the predetermined physical value is tile pressure, speed, density, or temperature of the fluid and the predetermined physical law is the mass conservation law, momentum conservation law, or energy conservation law.

A further aspect of the present invention is a program recording medium storing a program for making a computer execute some or all of means or sections of the fluid analyzer.

DESCRIPTION OF SYMBOLS

1 Grid generation section
2 Physical property value setting section
3 Boundary condition setting section
4 Boundary condition control section
5 Number-of-dimension control-analysis section
6 Repetitive computation control section
51 Momentum correction section
52 Pressure analysis section
53 Momentum analysis section
54 Pressure correction value analysis section
55 Mass correction value analysis section
56 Other physical value analysis section
100 Fluid analyzer
401 Wall
402 Floor
403 Ceiling
404 Window
405 Desk

DETAILED DESCRIPTION OF THE PREFERRED EMBODIMENTS

An embodiment of the present invention will be described below by referring to FIGS. 1 and 2.

Figure 1:
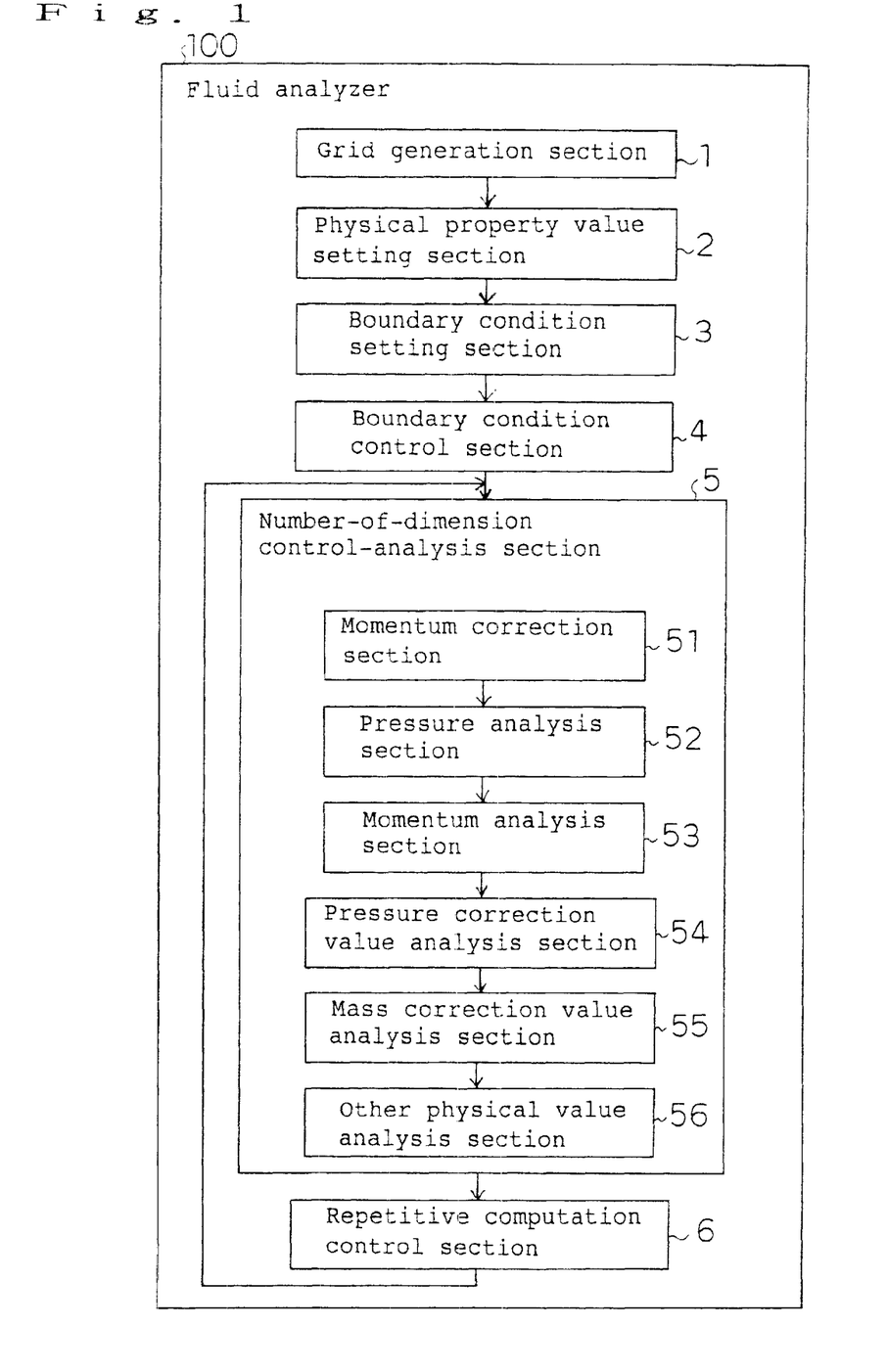
FIG. 1 is a block diagram of an embodiment of a fluid analyzer of the present invention.
Figure 2:
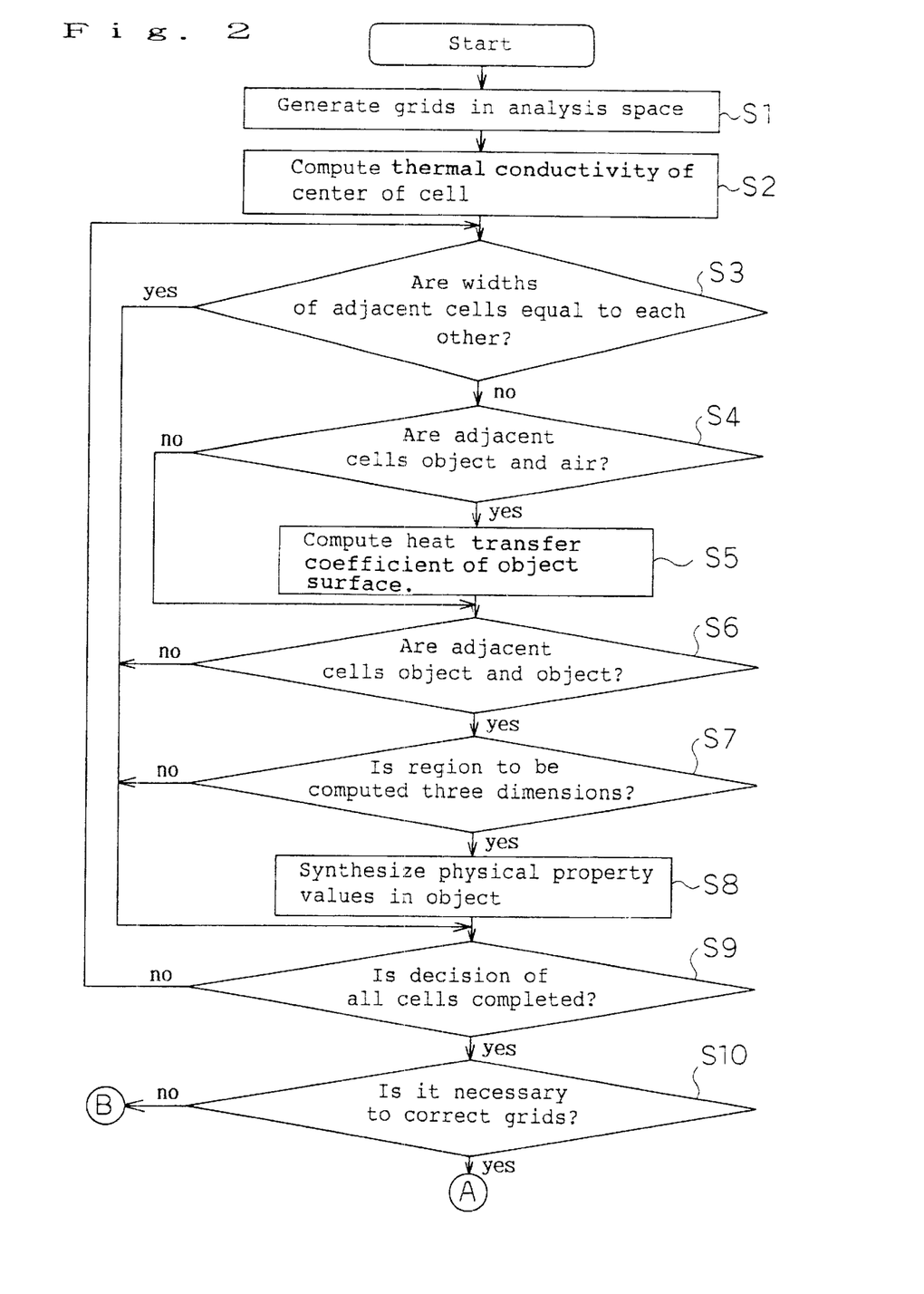
FIG. 2 is a flow chart for explaining operations of the embodiment in FIG. 1.

FIG. 1 is a schematic block diagram of an embodiment of a fluid analyzer of the present invention. FIG. 2 is an operation flow chart of the embodiment in FIG. 1. This embodiment is a fluid analyzer used to simulate a thermal environment such as amenity, heat load, or flow of housing.

In FIG. 1, a fluid analyzer 100 of this embodiment of present invention is configured by a grid generation section 1 for generating a grid of an analysis space, a physical-property value setting section 2 for setting a physical property value, a boundary-condition setting section 3 for setting a boundary condition, a boundary-condition control section 4 for controlling the boundary condition of an outlet or inlet, a number-of-dimension control-analysis section 5 for controlling and analyzing the number of dimensions in a part or the whole of an analysis space, and a repetitive-computation control section 6 for controlling repetition of various computations and competition of the cycle of this type of a series of repetitive computation with the number-of-dimension control-analysis section 5.

The number-of-dimension control-analysis section 5 is configured by a momentum correction section 51 for performing automatic correction in accordance with the information for an outlet or inlet angle, a pressure analysis section 52 for computing fluid pressure for each grid of a space to be analyzed, a momentum analysis section 53 for computing the speed of a fluid in accordance with the momentum conservation law, a pressure correction-value analysis section 54 for approximately correcting the pressure or speed of a fluid in accordance with the mass conservation lay by using a pressure distribution computed by the pressure analysis section 52 and a speed distribution computed by the momentum analysis section 53, a mass correction-value analysis section 55 for correcting a fluid speed obtained by the momentum analysis section 53 in accordance with the mass conservation law, and another physical-value analysis section 56 for computing physical values such as temperature and viscosity other than pressure and speed.

In addition to the above, various input units, memories, and output units are required to perform numerical analysis. However, these units do not directly relate to the gist of the present invention and they are self-evident arts. Therefore, illustration and description of them are omitted.

Figure 3:
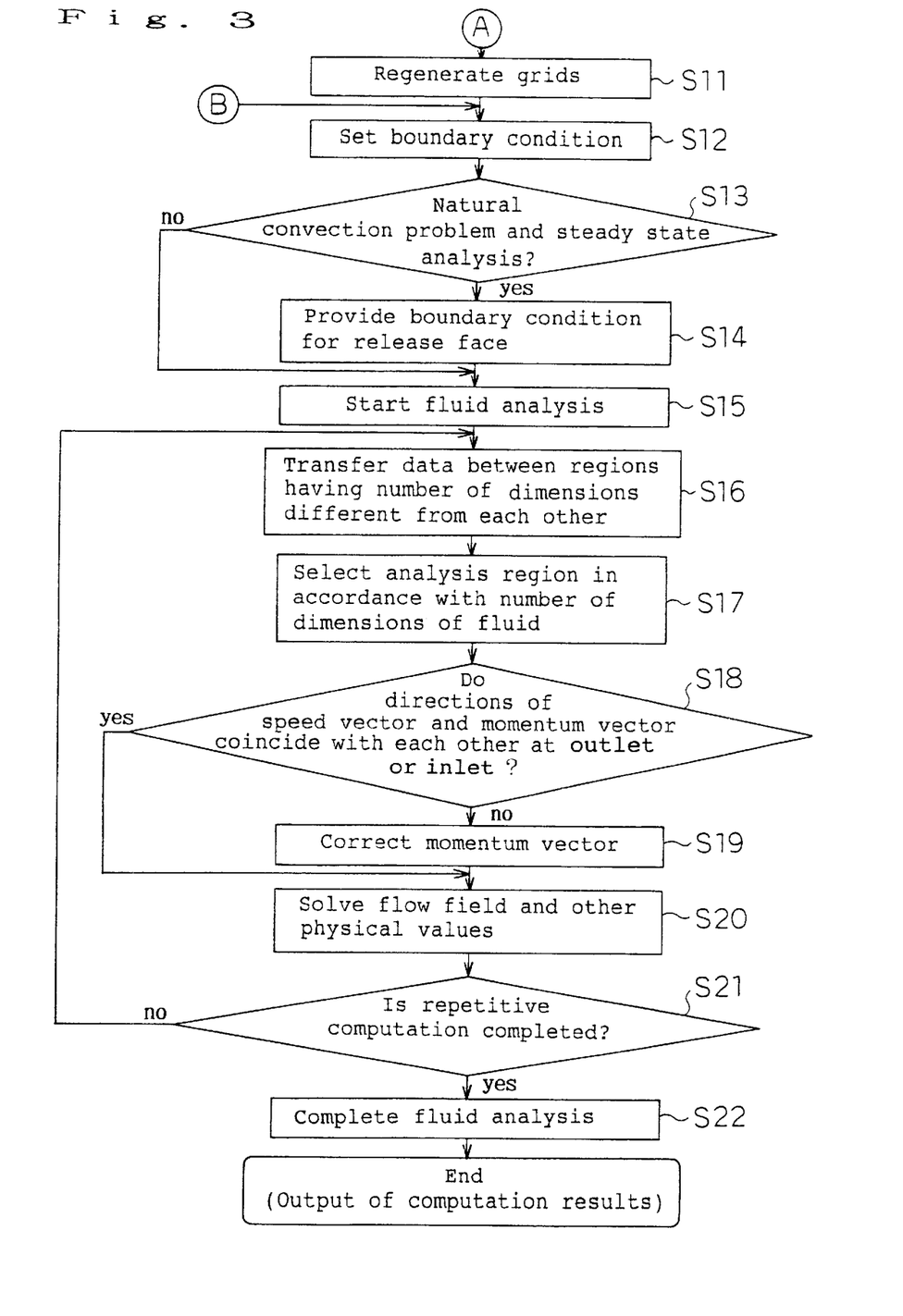
FIG. 3 is a flow chart for explaining operations of the embodiment in FIG. 1.

Then, operations directly relating to the present invention will be mainly described below by referring to FIGS. 2 to 7. FIGS. 2 and 3 are flow charts for explaining operations of this embodiment.

S1 (step S1): A proper grid is generated in a space region to be analyzed (refer to FIG. 2). In this case, as shown in, for example, FIG. 4, when a space to be analyzed has an indoor environment, a wall 401, a floor 402, a ceiling 403, a window 404, a desk 405 on which a glass plate is put, and the outlet and inlet of an air conditioner 406 or the like are provided for a three-dimensional space such as a room and grid division is performed in accordance with a predetermined procedure by using the information for minimum grid width, number of grid divisions, and grid division method.

Figure 4:
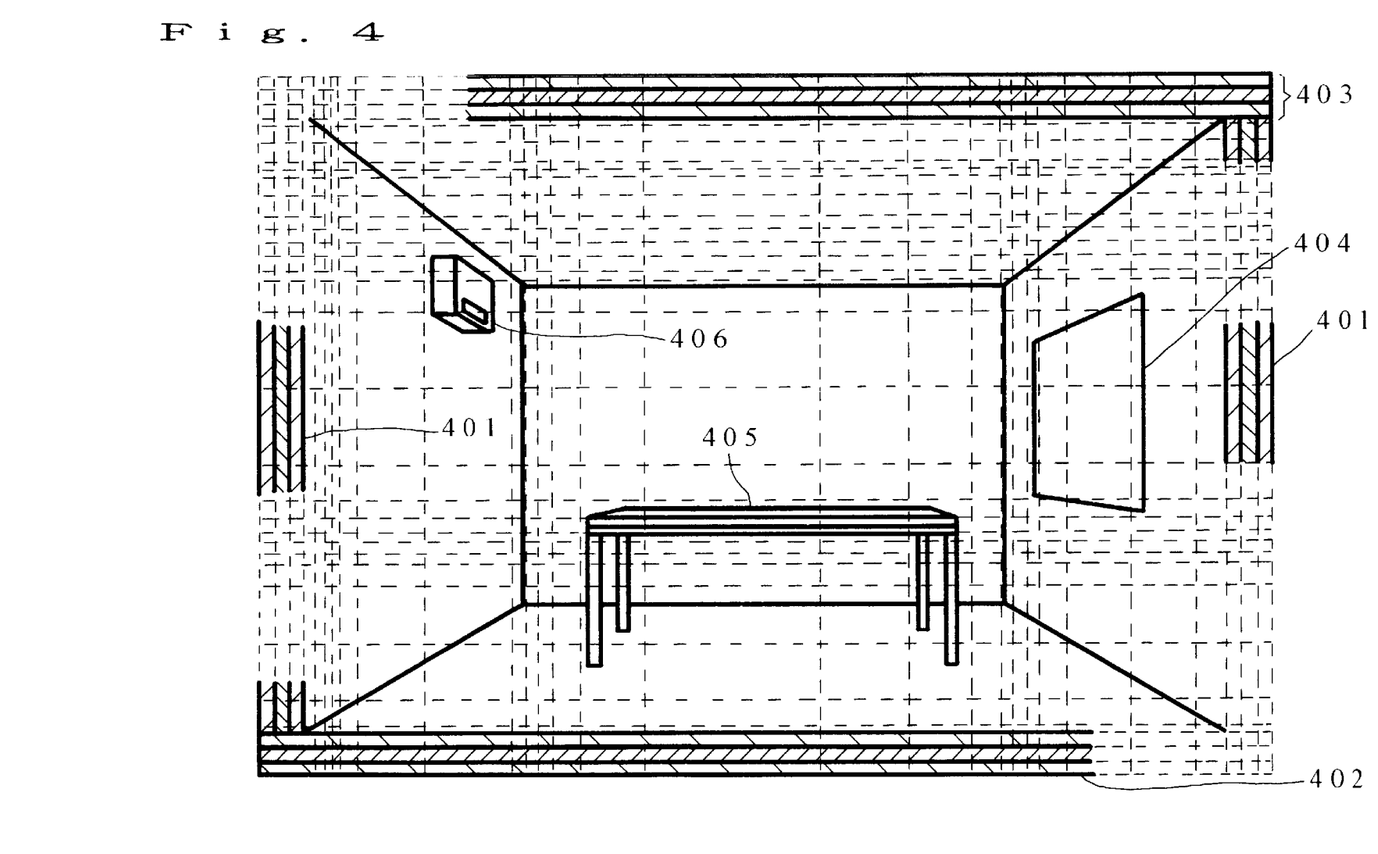
FIG. 4 is a schematic view showing generation of grids in the embodiment in FIG. 1.

FIG. 4 is a schematic sectional view showing the structure of a room and generation of grids when an object to be analyzed is an indoor space. In FIG. 4, grids are shown by broken lines and a plane drawing these grids corresponds to the cross section of the room. Moreover, as shown in FIG. 4, the wall 401, floor 402, and ceiling 403 respectively have a three-layer structure (shown by diagonals). However, it is difficult to discriminate between contours of them because the contours overlap with broken lines showing grids. Therefore, drawing of the contours is locally omitted so that description of the indoor structure is not interrupted.

Moreover, not only the positional information but also the information for physical property values such as density, specific heat, and thermal conductivity and the number of dimensions in a computation region are included in a cell serving as the minimum unit of a grid.

For example, in FIG. 4, a computation region is set so as to one-dimensionally analyze only the three-layer-structural wall 401, floor 402, and ceiling 403 and three-dimensionally analyze the remaining room space. At this stage, in case of the wall 401 designated so as to be analyzed in one dimension, grid division is performed in three dimensions but low-dimensional grid division is not performed, and an analysis method is only designated.

S2 (Step S2): the thermal conductivity of the middle point between all adjacent cells is obtained as harmonic mean.

S3 (Step S3): It is decided in accordance with divided grid information whether a physical property value differs in cells and widths of adjacent cells are equal to each other. S9 is started when the decision result is YES but S4 is started when the result is NO.

S4 (Step S4): It is decided in adjacent cells whether an object includes air and an object. S5 is started when the decision result is YES but S6 is started when the result is NO.

S5 (Step S5): The heat transfer coefficient from the surface temperature of an object to the temperature of the object exceeding the boundary layer of the fluid is automatically set in accordance with the temperature difference and the flow rate on the object surface and the conversion formula shown in "Heat Transfer Engineering Material, Revised Fourth Edition" edited by Japan Society of Mechanical Engineers and published in 1986.

Figure 5:
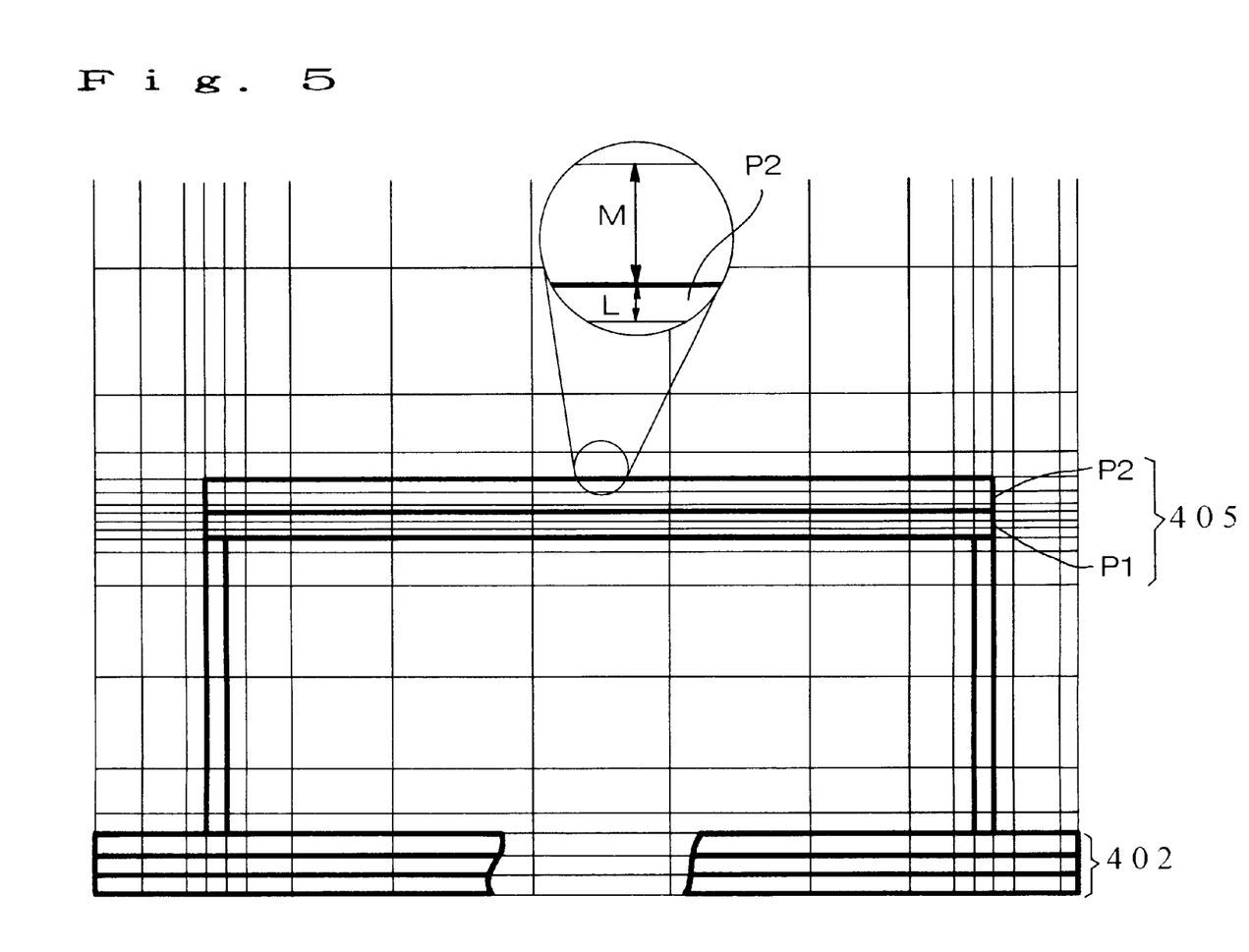
FIG. 5 is a schematic view showing comparison of cell widths in the embodiment in FIG. 1.

For example, as shown in FIG. 5, when widths L and M of cells in the vertical direction where air and the desk 405 are adjacent to each other on the surface of a glass plate P2 on an upper plate P1 of the desk 405 are not equal to each other, the heat transfer coefficient on the surface of the glass plate P2 is computed.

S6 (Step S6): It is decided in adjacent cells whether objects are different from each other. S7 is started for YES but S9 is started for NO.

S7 (Step S7): It is decided whether to analyze a cell in three dimensions. S8 is started for YES but S9 is started for NO.

S8 (Step S8): By regarding an object in which the above cell is included and which has a different physical property value as a larger object, physical property values such as density, specific heat, and heat conductivity are automatically synthesized.

For example, in FIG. 5, physical property values are synthesized by regarding the upper plate P1 and glass plate P2 on the desk as a large object.

S9 (Step S9): It is decided whether the above operation is completed for every cell. S10 is started for YES but S3 is started for NO.

S10 (Step S10): It is decided whether physical property values are synthesized or a low-dimensional computation region is present. S11 is started for YES but S12 is started for NO.

S11 (Step S11): Grid division is regenerated. In a three-dimensional computation region, an object in which physical property values are synthesized is regarded as a larger object and a low-dimensional computation region is also regarded as a cell to correct grids in a three-dimensional space.

Figure 6:
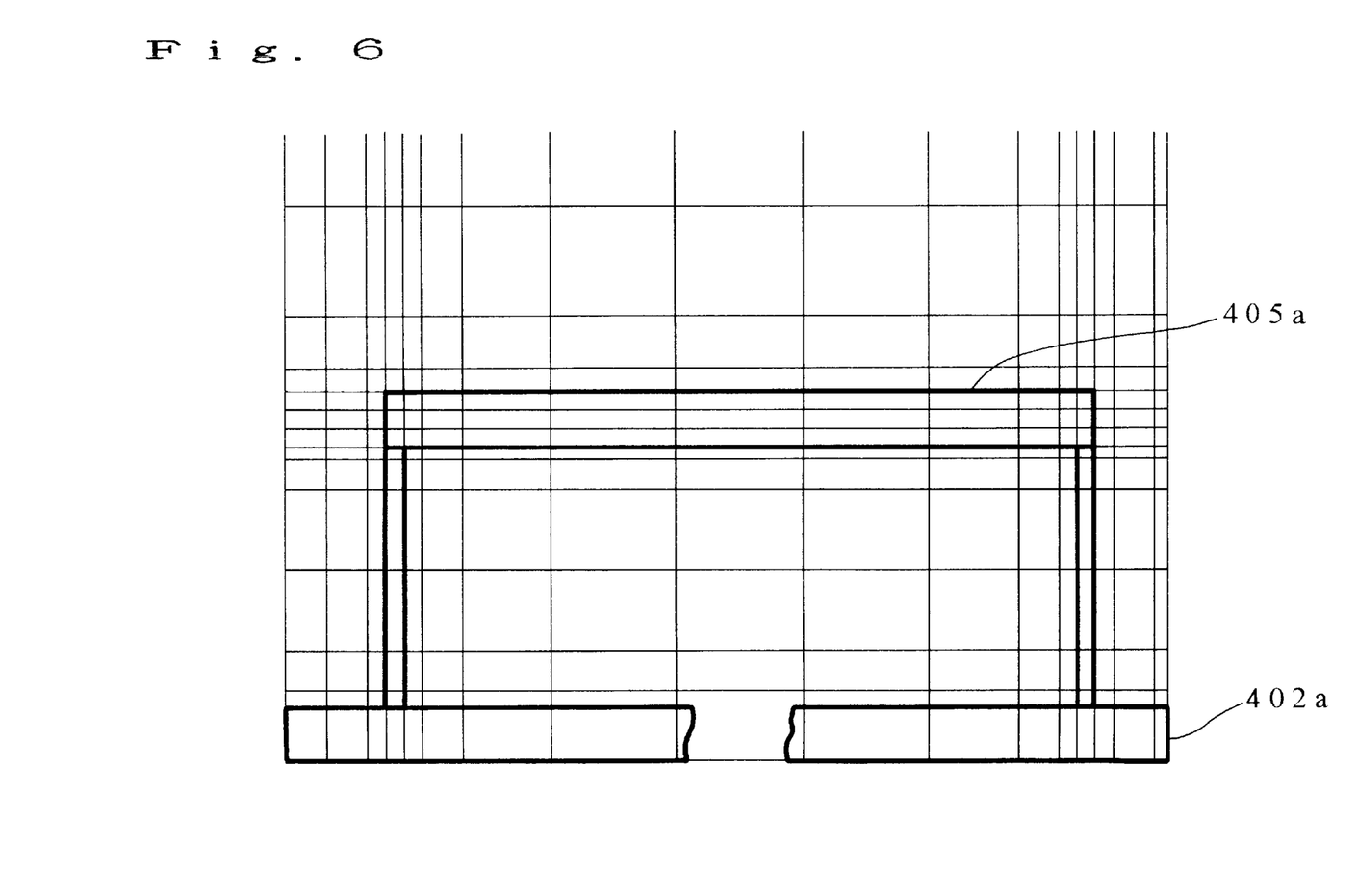
FIG. 6 is a schematic view showing regeneration of grids in the embodiment in FIG. 1.

For example, as shown in FIGS. 5 and 6, the upper plate P1 and glass plate P2 on the desk 405 are regarded as an object and the one-dimensional direction designating each of the three-layer-structural wall 401, floor 402, and ceiling 403 is assumed as a cell. Moreover, the low-dimensional computation region is reduced in dimension separately from a computation grid for three-dimensional analysis to newly generate a low-dimensional computation grid while keeping the original cell size. Therefore, it is possible to reduce the number of grid points in a three-dimensional computation region. Moreover, in the low-dimensional computation region, the heat conductivity of the center of a cell is obtained through harmonic mean while keeping the original cell size. Therefore, it is possible to improve the computation speed while keeping a computation accuracy. In FIG. 6, the desk 405 having the upper plate P1 and glass plate P2 shown in FIG. 5 is assumed as a desk 405a regarding the plates P1 and P2 as an object and a floor is shown as 402a when regarding the three-layer-structural floor 402 as a one-layer-structural floor. It is found that the grid interval in FIG. 6 is larger than that in FIG. 5 and moreover, the number of grids in FIG. 6 is smaller than that in FIG. 5. In this case, it is assumed that the wall and ceiling also respectively have a one-layer structure.

S12 (Step S12): Boundary conditions such as initial air temperature, wall temperature, and outlet temperature are set.

S13 (Step S13): It is automatically decided in accordance with boundary conditions whether a natural convection problem occurs and steady state analysis is performed.

S14 (Step S14): By assuming the release face to the outside of a computation region present at the upper side of a heat source as an outgoing face and the release face to the outside of the computation region present at the lower side of the heat source as an incoming face, a temperature rise after a predetermined time is computed in accordance with calorific value, heat capacity, and heat release and automatically converted into an air driving force corresponding to the temperature rise as the boundary condition for first-time computation. By adding the driving force to the boundary condition as an incoming-outgoing value, a condition for analyzing only a flow field is generated. As the boundary condition for second-time computation, a condition for analyzing only a temperature field is generated by using the flow field obtained through the first-time computation as an initial condition. As the boundary condition for third-time computation, a condition for analyzing a flow field, a temperature field, and other physical values is generated by using the flow field and temperature field obtained through the second-time computation as initial conditions and opening every release face out of the computation region to the atmosphere.

S15 (Step S15): Fluid analysis is started.

S16 (Step S16): Physical values are transferred to and from analysis regions having the number of dimensions different from each other at end faces of analysis regions.

S17 (Step S17): Computation is first started with one-dimensional analysis region in accordance with the number of dimensions analyzed by a computation region and then, analysis is continued in two-dimensional analysis and three-dimensional region in order. In this case, physical values delivered from end faces of different analysis regions are analyzed as boundary conditions at end faces of the analysis regions.

S18 (Step S18): It is automatically decided whether directions of a speed vector and a momentum vector coincide with each other in accordance with boundary conditions such as the area of and the air density and speed at an outlet or inlet.

S19 (Step S19): Unless directions of the speed vector and momentum vector coincide with each other, the momentum correction section 51 corrects only the area of an outlet or inlet within computation without changing computation grids so that the directions of the speed vector and momentum vector coincide with each other.

Figure 7:
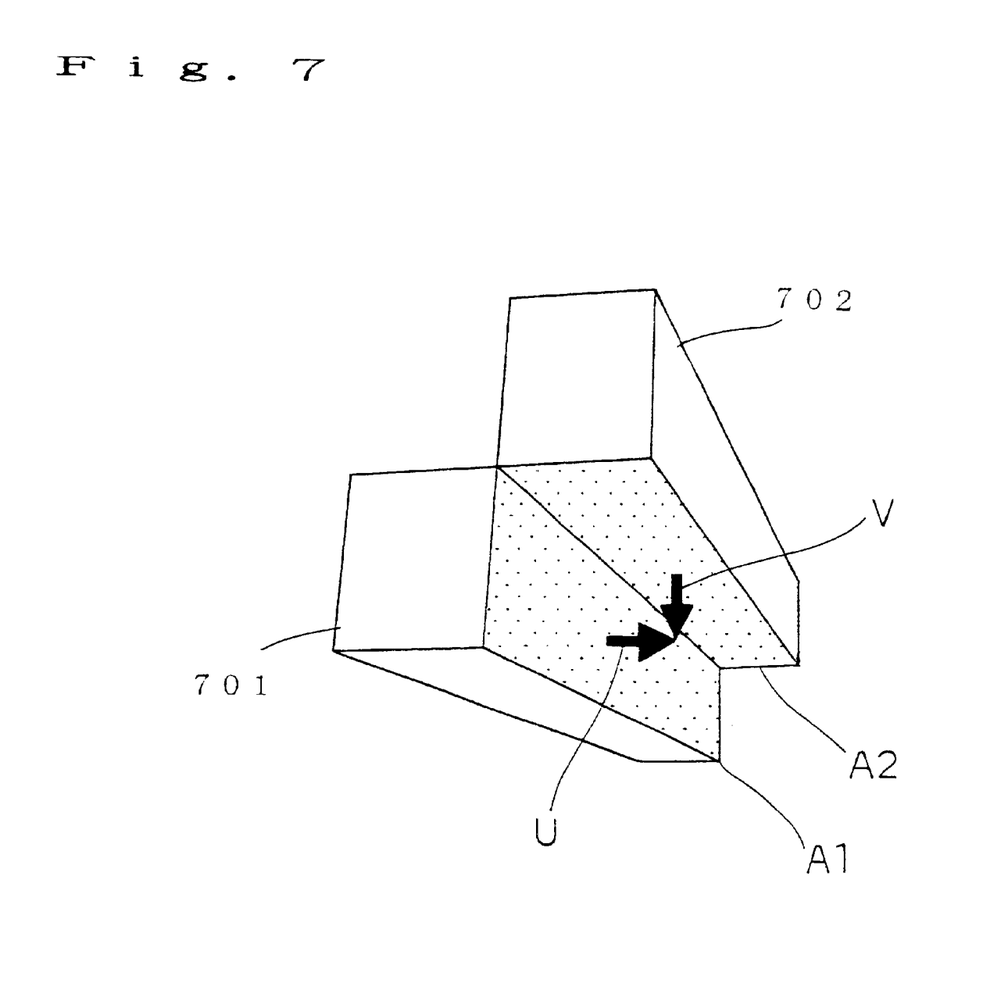
FIG. 7 is a schematic view showing an outlet in the embodiment in FIG. 1.

For example, as shown in FIG. 7, a case will be described below in which a horizontal speed vector U having an outlet area A1 is set to an outlet 701 and a vertical downward speed vector V having an outlet area A2 is set to an outlet 702.

In this case, to correctly reproduce diagonal outlet, it is necessary to make the direction of a speed vector synthesized with diagonal outlet coincide with the direction of a momentum vector. Therefore, the areas A1 and A2 are corrected so as to equalize the airflow of the outlet 701 with that of the outlet 702. In this case, however, only the areas or area A1 and/or A2 necessary to compute each cell are or is corrected instead of correcting the size of an outlet on a computation grid. Thereby, even if outlet angles are changed during computation, it is possible to compute diagonal outlet without changing any computation grids.

S20 (Step S20): The pressure analysis section 52, momentum analysis section 53, pressure correction value analysis section 54, mass correction value analysis section 55, and other physical analysis value analysis section 56 solve a flow field and other physical values in a region to be computed. In this case, it is assumed that the end face of each region holds a value computed before a region prior to each region in computation and sharing the end face and thereby, a Navier-Stokes equation configured by a continuous formula, a momentum conservation equation, and an energy conservation equation is solved. These expressions are previously given by an analyzer in accordance with a space or type of fluid to be analyzed. For example, when a fluid is an incompressible material such as water, the Navier-Stokes equation is simplified and converted into an analyzable expression by differentiation or coordinate transformation. Moreover, in case of the flow analysis for outlet or inlet of air from or into an air conditioner in an indoor space, it is necessary to consider a calorific value and the change of pressures and densities due to change of calorific values in addition to pressure, momentum, and mass. Furthermore, it is indispensable to repeatedly correct physical values by performing the first-time repetitive computation and moreover performing the second-time repetitive computation in accordance with an analysis result of the first-time repetitive computation.

S21 (Step S21): A repetitive computation control section 12 decides whether repetitive computation is completed. It is needless to say that the completion of the repetitive computation is decided in accordance with not only convergence of residual grids or iteration number of repetitive computation but also computation time in addition to whether a computation result is adaptive to a boundary condition or whether the result is different from the result of the last cycle.

S22 (Step 22): Fluid analysis computation is completed. Then, results are outputted in accordance with a predetermined procedure.

The present invention was described above in accordance with an embodiment. However, it is a matter of course that the present invention is not restricted to the above embodiment. That is, for example, it is possible to apply the present invention not only to analysis of housing environment but also to thermal fluid analysis such as heat dissipation analysis of electronic units or flow analysis around a building. Moreover, it is possible to apply the present invention to analysis of electromagnetic waves or stresses instead of analysis of a fluid such as water or air. It is a matter of course that the above analyses are performed by using a governing equation necessary for each analysis.

Moreover, the present invention is a medium such as an FD, MD, or CD-ROM storing a program for realizing all or some of functions of the above sections of the present invention with a computer. By making the program recording medium and thereby making a computer operate similarly to the above described, it is possible to show the advantage same as the above.

Moreover, it is optional to realize the present invention through software by using a computer or an exclusive hardware circuit provided with various functions.

As described above, a fluid analyzer of the present invention makes it possible to automatically set a physical property value or the boundary condition of a speed vector independently of grid division information. Moreover, it is possible to perform one- or two-dimensional computation in a three-dimensional space and thereby, resources can be effectively used. Furthermore, it is possible to automatically set a non-divergent boundary condition in the natural convection computation and thereby, the labor for re-computation when a boundary condition diverges can be omitted.

As described above, the present invention has an advantage that it is possible to further reduce computation time while keeping the accuracy of analysis.

What is claimed is:

1. A fluid analyzer having a grid generation section for generating the grid of an analysis space in order to analyze the fluid in the analysis space, comprising:

physical-property value setting means for setting a new physical-property value in accordance with different physical values when adjacent cells among cells each of which is a minimum unit determined by the generated grid show physical property values different from each other; and multi-dimension grid control-analysis means for (1) performing first analysis of the analysis space of a predetermined dimension by considering the adjacent cells as a larger-size new cell and using the new cell and the set physical property value and (2) replacing a partial region including the adjacent cells with a space at a dimension lower than the predetermined dimension, performing second analysis of the partial region in accordance with the original size of the adjacent cells and reflecting the result of the second analysis on the result of the first analysis.

2. A fluid analyzer comprising:

a grid generation section for generating the grid of an analysis space;

a boundary condition setting section for setting a boundary condition to the grid generated by the grid generation section;

fluid physical-value analysis section for computing the predetermined physical value of a fluid in accordance with given formula and boundary condition;

a fluid physical-value correction-analysis section for approximately correcting a result by the fluid physical-value analysis section in accordance with the fluid state of a pressure distribution and/or a speed distribution computed by the fluid physical-value analysis section and the physical property value of each physical value of a previously-given fluid or a predetermined physical law; and a repetitive-computation and control section for repeating computations from the fluid physical-value analysis section up to the fluid physical-value correction-analysis section in accordance with a predetermined procedure; wherein a physical-property-value setting section is included which sets a new physical property value in accordance with at least the position of an object and grid information including the divided state of the grid.

3. The fluid analyzer according to claim 2, wherein the predetermined physical value is the pressure, speed, density, or temperature of the fluid, the predetermined physical law is the mass conservation law, momentum conservation law, or energy conservation law, and a number-of-dimension control-analysis section is included which performs analysis as a one-dimensional or two-dimensional space in some or all regions in the three-dimensional space of the grid generated by the grid generation section.

4. A fluid analyzer comprising:

a grid generation section for generating the grid of an analysis space;

a boundary condition setting section for setting a boundary condition to the grid generated by the grid generation section;

fluid physical-value analysis section for computing the predetermined physical value of a fluid in accordance with given formula and boundary condition;

a fluid physical-value correction-analysis section for approximately correcting a result by the fluid physical-value analysis section in accordance with the fluid state of a pressure distribution and/or a speed distribution computed by the fluid physical-value analysis section and the physical property value of each physical value of a previously-given fluid or a predetermined physical law; and a repetitive-computation and control section for repeating computations from the fluid physical-value analysis section up to the fluid physical-value correction-analysis section in accordance with a predetermined procedure; wherein a physical-property-value setting section is included which sets a new physical property value in accordance with at least the position of an object and grid information including the divided state of the grid, and a momentum correction section is included which automatically corrects the momentum of a speed vector set to an outlet or inlet provided for the analysis space in accordance with the divided state of a grid and the information for an outlet or inlet angle.

5. A fluid analyzer comprising:

a grid generation section for generating the grid of an analysis space;

a boundary condition setting section for setting a boundary condition to the grid generated by the grid generation section;

fluid physical-value analysis section for computing the predetermined physical value of a fluid in accordance with given formula and boundary condition;

a fluid physical-value correction-analysis section for approximately correcting a result by the fluid physical-value analysis section in accordance with the fluid state of a pressure distribution and/or a speed distribution computed by the fluid physical-value analysis section and the physical property value of each physical value of a previously-given fluid or a predetermined physical law; and a repetitive-computation and control section for repeating computations from the fluid physical-value analysis section up to the fluid physical-value correction-analysis section in accordance with a predetermined procedure; wherein a physical-property-value setting section is included which sets a new physical property value in accordance with at least the position of an object and grid information including the divided state of the grid, the predetermined physical value is the pressure, speed, density, or temperature of the fluid, the predetermined physical law is the mass conservation law, momentum conservation law, or energy conservation law, and a number-of-dimension control-analysis section is included which performs analysis as a one-dimensional or two-dimensional space in some or all regions in the three-dimensional space of the grid generated by the grid generation section, and a momentum correction section is included which automatically corrects the momentum of a speed vector set to an outlet or inlet provided for the analysis space in accordance with the divided state of a grid and the information for an outlet or inlet angle.

6. A fluid analyzer comprising:

a grid generation section for generating the grid of an analysis space;

a boundary condition setting section for setting a boundary condition to the grid generated by the grid generation section;

fluid physical-value analysis section for computing the predetermined physical value of a fluid in accordance with given formula and boundary condition;

a fluid physical-value correction-analysis section for approximately correcting a result by the fluid physical-value analysis section in accordance with the fluid state of a pressure distribution and/or a speed distribution computed by the fluid physical-value analysis section and the physical property value of each physical value of a previously-given fluid or a predetermined physical law; and a repetitive-computation and control section for repeating computations from the fluid physical-value analysis section up to the fluid physical-value correction-analysis section in accordance with a predetermined procedure; wherein a physical-property-value setting section is included which sets a new physical property value in accordance with at least the position of an object and grid information including the divided state of the grid, and a boundary condition control section is included which controls the boundary condition of an outlet or an inlet in accordance with the boundary condition set by the boundary condition setting section.

7. A fluid analyzer comprising:

a grid generation section for generating the grid of an analysis space;

a boundary condition setting section for setting a boundary condition to the grid generated by the grid generation section;

fluid physical-value analysis section for computing the predetermined physical value of a fluid in accordance with given formula and boundary condition;

a fluid physical-value correction-analysis section for approximately correcting a result by the fluid physical-value analysis section in accordance with the fluid state of a pressure distribution and/or a speed distribution computed by the fluid physical-value analysis section and the physical property value of each physical value of a previously-given fluid or a predetermined physical law; and a repetitive-computation and control section for repeating computations from the fluid physical-value analysis section up to the fluid physical-value correction-analysis section in accordance with a predetermined procedure; wherein a physical-property-value setting section is included which sets a new physical property value in accordance with at least the position of an object and grid information including the divided state of the grid, the predetermined physical value is the pressure, speed, density, or temperature of the fluid, the predetermined physical law is the mass conservation law, momentum conservation law, or energy conservation law, and a number-of-dimension control-analysis section is included which performs analysis as a one-imensional or two-dimensional space in some or all regions in the three-dimensional space of the grid generated by the grid generation section, and a boundary condition control section is included which controls the boundary condition of an outlet or an inlet in accordance with the boundary condition set by the boundary condition setting section.

8. The fluid analyzer according to claim 4, wherein a boundary condition control section is included which controls the boundary condition of an outlet or an inlet in accordance with the boundary condition set by the boundary condition setting section.

9. The fluid analyzer according to claim 5, wherein a boundary condition control section is included which controls the boundary condition of an outlet or an inlet in accordance with the boundary condition set by the boundary condition setting section.

10. The fluid analyzer according to claim 2, wherein the predetermined physical value is the pressure, speed, density, or temperature of the fluid and the predetermined physical law is the mass conservation law, momentum conservation law, or energy conservation law.

11. The fluid analyzer according to claim 3, wherein the predetermined physical value is the pressure, speed, density, or temperature of the fluid and the predetermined physical law is the mass conservation law, momentum conservation law, or energy conservation law.

12. The fluid analyzer according to claim 4, wherein the predetermined physical value is the pressure, speed, density, or temperature of the fluid and the predetermined physical law is the mass conservation law, momentum conservation law, or energy conservation law.

13. The fluid analyzer according to claim 5, wherein the predetermined physical value is the pressure, speed, density, or temperature of the fluid and the predetermined physical law is the mass conservation law, momentum conservation law, or energy conservation law.

14. The fluid analyzer according to claim 6, wherein the predetermined physical value is the pressure, speed, density, or temperature of the fluid and the predetermined physical law is the mass conservation law, momentum conservation law, or energy conservation law.

15. The fluid analyzer according to claim 7, wherein the predetermined physical value is the pressure, speed, density, or temperature of the fluid and the predetermined physical law is the mass conservation law, momentum conservation law, or energy conservation law.

16. The fluid analyzer according to claim 8, wherein the predetermined physical value is the pressure, speed, density, or temperature of the fluid and the predetermined physical law is the mass conservation law, momentum conservation law, or energy conservation law.

17. The fluid analyzer according to claim 9, wherein the predetermined physical value is the pressure, speed, density, or temperature of the fluid and the predetermined physical law is the mass conservation law, momentum conservation law, or energy conservation law.

18. A program recording medium storing a program for making a computer execute some or all of means or sections of the fluid analyzer according to claim 1.

19. A program recording medium storing a program for making a computer execute some or all of means or sections of the fluid analyzer according to claim 2.

* * * * *

UNITED STATES PATENT AND TRADEMARK OFFICE
CERTIFICATE OF CORRECTION

PATENT NO.    : 6,405,142 B1
DATED         : June 11, 2002
INVENTOR(S)   : Osamu Ogawa et al.

It is certified that error appears in the above-identified patent and that said Letters Patent is hereby corrected as shown below:

<u>Column 3,</u>
Line 56, delete "tile" and insert therefor -- the --

<u>Column 12,</u>
Line 1, delete "one-imensional" and insert therefor -- one-dimensional --

Signed and Sealed this

Sixteenth Day of September, 2003

JAMES E. ROGAN
*Director of the United States Patent and Trademark Office*